United States Patent [19]

Flagel

[11] 3,942,282

[45] Mar. 9, 1976

[54] MINNOW HARNESS FOR FISHING

[76] Inventor: Clarence E. Flagel, 521 S. Bridge St., Markesan, Wis. 53946

[22] Filed: Apr. 14, 1975

[21] Appl. No.: 567,904

[52] U.S. Cl. .................................... 43/44.2
[51] Int. Cl.² ................................. A01K 83/06
[58] Field of Search ......................... 43/44.2

[56] References Cited
UNITED STATES PATENTS

| | | | |
|---|---|---|---|
| 859,677 | 7/1907 | Martin | 43/44.2 |
| 2,211,064 | 8/1940 | Krumdick | 43/44.2 |

FOREIGN PATENTS OR APPLICATIONS

| | | | |
|---|---|---|---|
| 578,042 | 6/1959 | Canada | 43/44.2 |

*Primary Examiner*—Hugh R. Chamblee
*Assistant Examiner*—Daniel J. Leach
*Attorney, Agent, or Firm*—Wheeler, Morsell, House & Fuller

[57] ABSTRACT

A fishing device for supporting a bait fish in a generally horizontal disposition includes a rigid wire shank connected to two bait spears, and a braided wire cable which is wrapped around and frictionally engaged with the shank portion and provided with a loop at one end of said shank portion for connection to a fishline and a hook at the other end which is embedded in the bait. When a fish is hooked, the cable is displaced from a first position parallel with the spears to a second position generally parallel with said shank portion to provide a taut line during fish retrieval.

5 Claims, 2 Drawing Figures

U.S. Patent    March 9, 1976    3,942,282
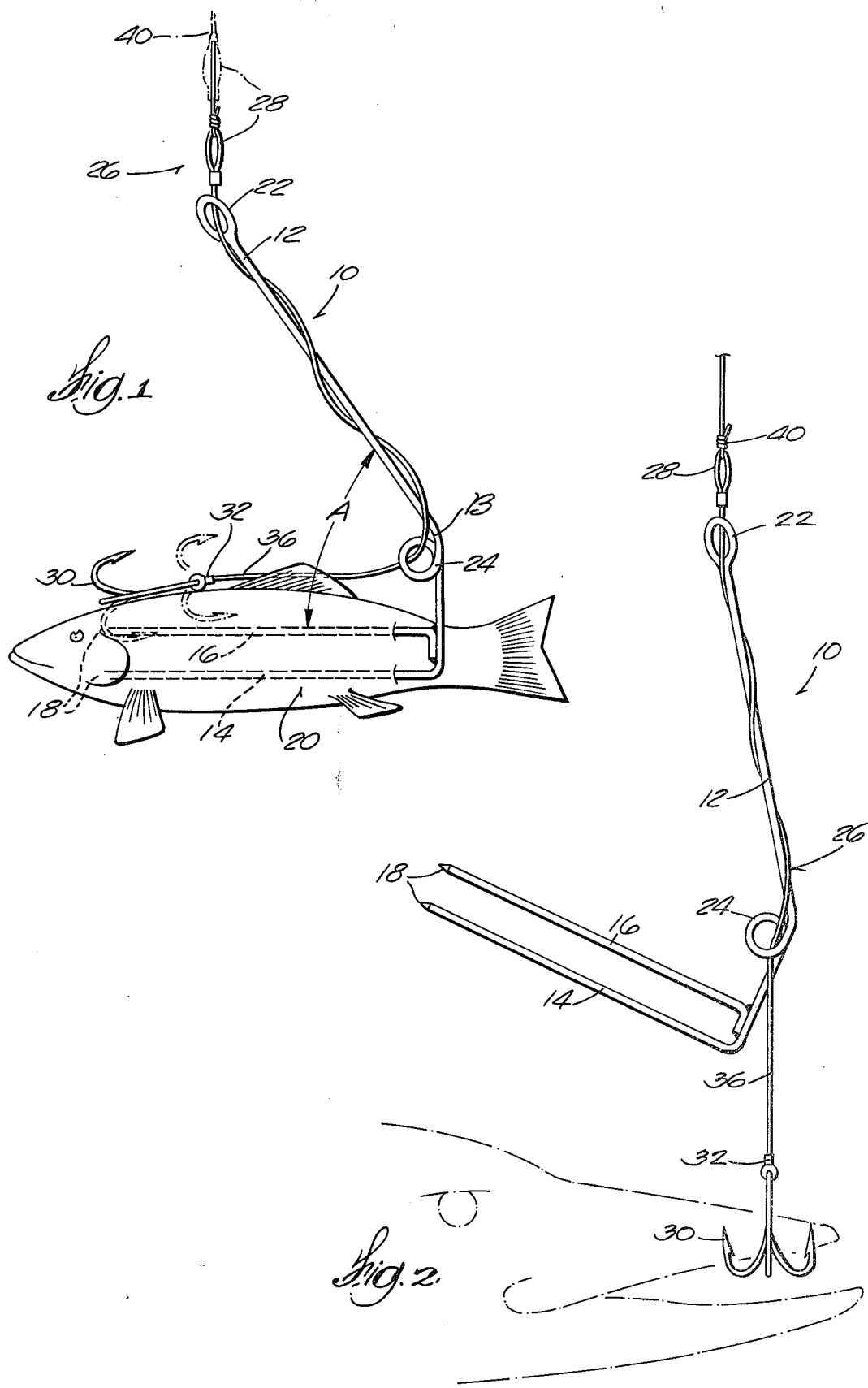

MINNOW HARNESS FOR FISHING

BACKGROUND OF INVENTION

The fishing device of the invention is particularly adapted for fishing large bait fish in a generally horizontal position. Prior art devices such as the Swedish pike hook are intended to accomplish these results. However, the Swedish pike hook is completely rigid and in view of the angle between the loop where the fishline is connected and the hook, when a fish is caught, the fish can easily dislodge itself from the hook.

SUMMARY OF INVENTION

The invention provides a fishing device which utilizes two spears for supporting the bait fish. The second spear prevents rotation of the bait fish which could occur if only one spear was utilized. The spears are connected to a shank portion which is provided with upper and lower eyes, and a flexible cable is wrapped around the shank portion between the eyes to provide a frictional engagement of the cable with the shank portion. One end of the cable is provided with a loop for connection to a fishline and the other end of the cable is provided with a loop which is attached to a fishhook. The flexible cable is longer than the distance between the loops on the shank portion and thus the position of the hook can be adjusted to accommodate different sizes of minnows or bait.

In addition, upon the hooking of a fish the hook will be displaced from the position engaged with the bait fish and the cable will swing free of the bait fish to a generally parallel position with the shank portion. Accordingly, upon retrieval of the fish the hook will be in a straight line connection with the fishline with a flexible connection which enables the fisherman to maintain the fishline in a taut condition to prevent escape of the fish.

Further objects, advantages and features of the invention will become apparent from the following disclosure.

DESCRIPTION OF DRAWINGS

FIG. 1 is a side elevational view of the fishing device of the invention showing its position during use.

FIG. 2 is a view of the fishing device showing the position of the components after a fish is hooked.

DETAILED DESCRIPTION OF PREFERRED EMBODIMENT

Although the disclosure hereof is detailed and exact to enable those skilled in the art to practice the invention, the physical emobidments herein disclosed merely exemplify the invention which may be embodied in other specific structure. The scope of the invention is defined in the claims appended hereto.

The fishing device 10 includes a shank portion 12 and a first angularly related portion or spear 14. A second angularly related portion 16 is generally parallel with the portion 14. Spears 14, 16 have points 18 for impaling a bait fish 20. The use of two spears prevents the rotation of the bait fish which would occur if the bait fish is centered on only one spear. The spear 14 is formed from the same length of rod or wire material used in shank 12. The spear 16 is a separate length of material which is welded, or otherwise secured to the shank portion 12.

The shank portion is provided with an open loop 22 and an intermediate loop 24 formed integrally with the shank portion. The shank portion and spears are formed from malleable stainless steel which is corrosion resistant and can be adjusted as hereinafter described.

The fishing device also includes flexible braided cable 26 which has a loop 28 at one end and a fishhook 30 connected to the end 32. The cable 26 is wrapped or trained around the shank portion 12 to provide a frictional engagement with the shank portion. Thus, the cable can be pulled at either end to slide the cable along the shank portion and vary the position of the hook 30 with respect to the loop 24. Accordingly, the hook can be secured to bait in the position shown in solid lines or can be secured in the postion shown in broken lines for a shorter bait fish. FIG. 2 shows a flexible cable portion 36 displaced from the position shown in FIG. 1 to a position generally parallel with the shank portion 12, and thus, in a generally straight line connection between the fishline 40 and the hook 30, to enable the fisherman to keep the line taut. In addition, the flexibility of the cable length 36 aids in keeping the fish hooked particularly if a rigid portion of the device became entangled in obstacles or the like.

The angle A between the shank 12 and spear 16 can be adjusted to dispose the bait in a horizontal position by bending the shank 12 at or near point B.

In use of the fishing device, the spears are inserted in the bait fish as shown so they will end up in the head of the bait. The barb of a hook which may be single or treble as shown, is anchored in the head of the bait fish. At the loop 24 slack in the cable is taken up. Slack is then taken up at the loop 22 pulling on the calbe loop 28. The friction of the cable around the shank will prevent the bait fish from becoming loose and sliding from the spears.

Although limited flexibility in the use of various size bait fishes is afforded by the construction illustrated, a wider range of bait fish capability is afforded by use of two or three different sizes of fishing devices.

When a game fish is caught on the hook 30 (FIG. 1), the hook 30 is easily torn or ripped out of the bait fish and the hook 30 and flexible cable portion 36 swing free of the spears 14 and 16 to the FIG. 2 position. In the FIG. 2 position, the strand is taut without any slack and thus, the fish cannot easily free itself from the hook.

I claim:

1. A fishing device comprising a rigid shank portion, an angularly related portion extending from said shank portion and adapted to support bait, a flexible strand wrapped around and in frictional engagement with said shank portion and including means at one end of said shank portion for connection to a fishline and hook means at the other end adapted for connection to bait at a point remote from said shank portion and said strand having a strand portion in a first position non-parallel relative to said shank portion when said hook is connected to bait and said strand portion being displaceable from said first position to a second position generally parallel with said shank portion after a fish is caught and during fish retrieval.

2. A fishing device in accordance with claim 1 which includes two spaced angularly related portions for impaling the bait.

3. A fishing device in accordance with claim 1 which includes a first loop at one end of said shank portion and a second loop intermediate said shank portion and wherein said flexible strand is trained around said shank portion and extends through said loop.

4. A fishing device in accordance with claim 3 wherein said flexible strand is a braided wire cable.

5. A fishing device in accordance with claim 1 wherein said angularly related portion and said shank portion are deformable to vary the angle therebetween to maintain the bait at a generally horizontal disposition when in use.

* * * * *